(No Model.)

M. F. BEAL.
HEATING APPARATUS.

No. 567,575. Patented Sept. 15, 1896.

Witnesses:
Walter E. Lombard

Inventor
Morton F. Beal,
by Crosby & Gregory
Att'ys.

UNITED STATES PATENT OFFICE.

MORTON F. BEAL, OF WELLESLEY HILLS, MASSACHUSETTS.

HEATING APPARATUS.

SPECIFICATION forming part of Letters Patent No. 567,575, dated September 15, 1896.

Application filed October 1, 1895. Serial No. 564,253. (No model.)

*To all whom it may concern:*

Be it known that I, MORTON F. BEAL, of Wellesley Hills, county of Norfolk, State of Massachusetts, have invented an Improvement in Heating Apparatus, of which the following description, in connection with the accompanying drawings, is a specification, like letters and figures on the drawings representing like parts.

This invention has for its object the production of a novel and simple heating apparatus for effectively heating a room by the flame of an oil or gas lamp, the heat of the flame being utilized to raise the temperature of a large metallic surface over which the cool air passes. A most efficient and compact heater is thereby attained, and free from odor, and the heat of the flame, instead of coming directly in contact with the air to produce a comparatively small heating effect, is utilized to heat the greatest possible quantity of air in an indirect manner. I have herein shown my invention as applicable for use with either an oil or gas flame, though the apparatus for use with an oil-flame is preferable in most instances on account of cheapness and convenience.

Figure 1:
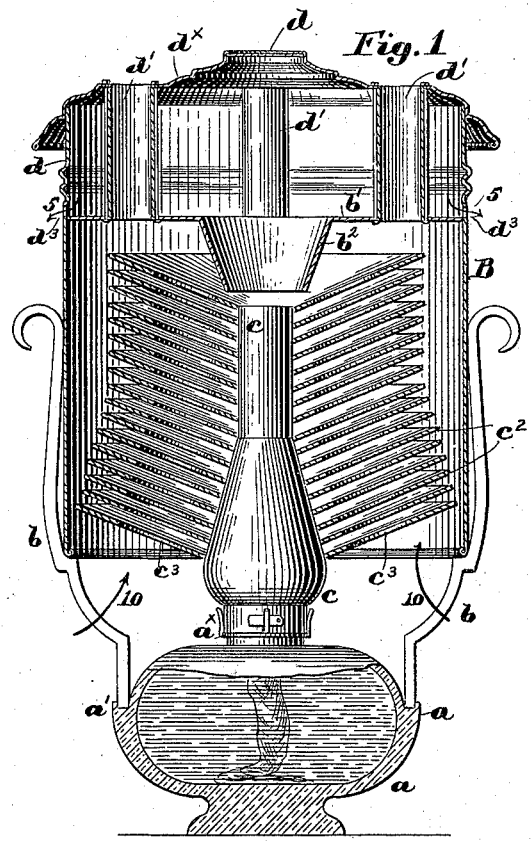
Figure 3:
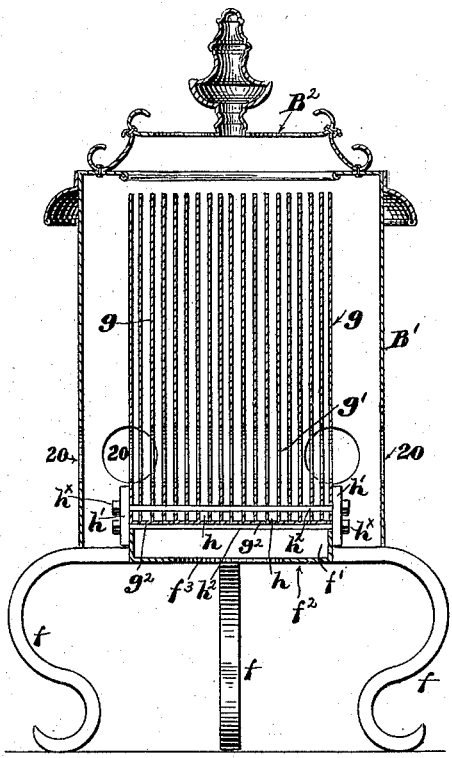
Figure 2:
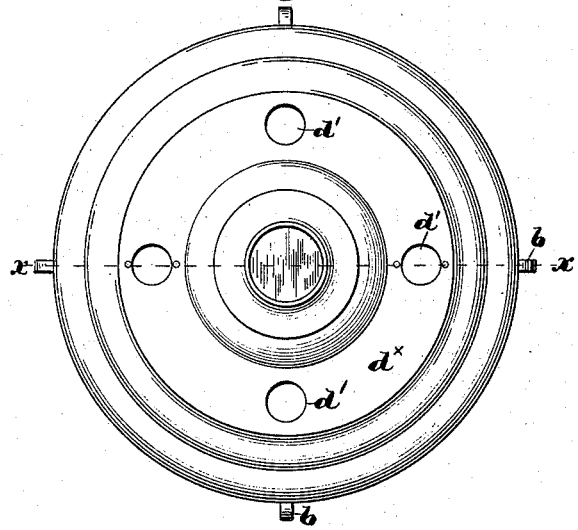
Figure 4:
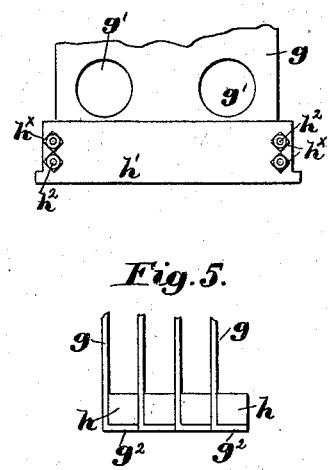

Figure 1 is a vertical section taken on the line $x$ $x$, Fig. 2, of a heating apparatus embodying my invention adapted for use with an oil-flame, the central heating-flue being shown in elevation. Fig. 2 is a top or plan view of the heater shown in Fig. 1. Fig. 3 is a vertical sectional view of a modified form of heater adapted for use with a gas-flame. Fig. 4 is a detail side view of the stack of radiating-surfaces shown in Fig. 3 and broken off to save space, and Fig. 5 is an enlarged detail showing the manner in which the radiating-surfaces are maintained in position.

Referring to Fig. 1, I have shown the bulb or oil-chamber $a$ of a lamp surmounted by a burner of any desired construction, the base $a^\times$ thereof being shown, said oil-chamber having an external flange $a'$, upon which rest standards $b$, attached to a cylinder B of thin sheet metal, such as iron, and open at its bottom, surmounting the oil-lamp. Upon the burner-base $a^\times$ is mounted a flue $c$, preferably of sheet-copper, and shaped substantially like an ordinary glass chimney and taking its place, said flue having an opening in its lower end, closed by a cover $c'$, whereby access may be had to the lamp-flame. Rigidly secured to the flue $c$ exteriorly, by fastening in any suitable manner, are a series of inverted cones $c^2$, also preferably made of sheet-copper, separated from each other by an air-space and extending up within the cylindrical casing B. A top $b'$ is secured to the upper end of the said casing, having a central opening surrounded at the under side of the top by an inverted cone $b^2$, its open lower end being somewhat larger than and located directly over the top of the flue $c$. A cylindrical heating-drum $d$, which may be made ornamental in shape, is mounted on the casing B, and a series of open-ended pipes or conduits $d'$, four being shown in Fig. 2, pass from the top $b'$ of the casing to the top of the drum, establishing communication between the upper part of the casing B and the outer air at the top $d^\times$ of the drum. In the center of said top $d^\times$ is an aperture covered with mica or other suitable transparent material $d^2$, through which the flame may be observed and regulated, as may be necessary.

Openings $d^3$ in the lower part of the side walls of the drum permit the passage therethrough of the heated products in the direction of arrows 5, Fig. 1. In each cone $c^2$ apertures $c^3$ are made, and, as shown in Fig. 1, two such apertures or holes are made diametrically opposite, the apertures being so located in the series of cones that they make passages up through the stack, as clearly shown. The flame heats the metal flue $c$, which in turn conveys its heat to the series of heating-surfaces $c^2$, and the cold air passing in at the bottom of the casing B in the direction of arrows 10 is heated in passing over and between the heating-cones $c^2$, rising in the casing and passing through the pipes or flues $d'$ of the drum $d$ to the room thoroughly heated. The products of combustion pass from the flue $c$ through the cone $b^2$ into the drum, serving to thoroughly heat it and to still further heat the air as it passes through the escape-flues $d'$, while the volatile products can escape by the apertures $d^3$. It will thus be seen that a very large aggregate of heating-surface is obtained in a comparatively small space, and that a large volume of air is compelled to pass thereover in passing from the bottom of the casing B to the escape-flues, giving a very much greater heating effect than would be possible were the air to be heated by direct contact with the flame. The openings $c^3$ in the heating-surfaces $c^2$ permit the air to circulate between them, so that a layer of air is heated on both sides between each pair of cones. The uppermost conical heating-plate, in conjunction with the inverted cone $b^2$, acts to deflect or turn the heated air out toward the side wall of the casing B to better distribute it before it passes through the escape-flues $d'$.

Figure 5:
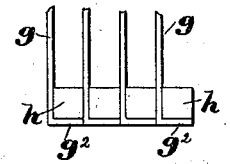

In adapting the heater for use with a gas-flame some modifications in the structure are necessary and desirable, and such construction is shown in Figs. 3 to 5, inclusive.

Referring to Fig. 3, a casing B', preferably rectangular in cross-section, is mounted on suitable supports $f$, said casing being open at the bottom and having an ornamental openwork top or cover $B^2$. A sheet-metal chamber $f'$, having an open top and a bottom $f^2$, provided with a flame-receiving aperture $f^3$, supports the heating-surface, shown as a series of thin, preferably sheet-copper, plates $g$, arranged vertically and in parallelism, and punctured near their lower ends, as at $g'$, Figs. 3 and 4, for the circulation of the air to be heated.

The lower edges of all the plates but one of the outside plates are bent at right angles at $g^2$, (clearly shown in Fig. 5,) and between each pair of plates is placed a steel bar $h$, rectangular in cross-section, resting in the angle of one plate and against the back of the next.

Retaining plates or castings $h'$, located at the outer sides of the heating-stack and embracing the sides of the flame-containing chamber $f'$, are held together by rods $h^2$, extending from one to the other and clamped by nut $h^\times$, screwed onto the threaded projecting ends of said rods. These rods are shown located just outside of the vertical edges of the heating-plates in Fig. 4, and serve to draw them tightly together against the interposed bars $h$, so that the stack is rigidly held in place in a simple yet efficient manner.

The bars $h$ separate the adjacent heating-surfaces the proper distance to admit layers of air between, and they also, becoming heated by the flame, increase the heating effect.

As shown in Fig. 3, the bent edges $g^2$ of the plates $g$ form an almost continuous cover for the flame-chamber $f'$, and the direct contact of the frame therewith heats the remaining portion of each plate by conduction.

Openings 20 in the side walls of the casing B', at the level of the openings $g'$ in the stack, admit the air to be heated, which circulates around and between the plates $g$, the latter dividing the air into a series of comparatively thin layers or strata, and when thoroughly heated the air passes in large volume through the open top of the casing into the room.

Any well-known form of "Bunsen" burner is preferably used to produce the flame, the burner being located below the heater, so that its flame will be substantially inclosed within the chamber $f'$.

My invention is not restricted to the precise construction and arrangement herein shown, as the same may be modified without departing from the spirit and scope of my invention, the gist of which consists in dividing the air into a series of thin layers by extended heating-surfaces, the latter being heated directly from the flame of a suitable burner.

I claim—

1. An air-heating apparatus, comprising an inclosing casing or shell through which the air to be heated passes, a series of parallel and separated sheet-metal heating-surfaces within the casing and unconnected therewith, said heating-surfaces being provided with air-circulatory openings, a metallic support for said surfaces, and means, as a flame, inclosed by said support, to heat the same, substantially as described.

2. An air-heating apparatus comprising an inclosing casing or shell open at its lower end, a series of slightly-separated substantially-parallel sheet-metal heating-plates within the casing and unconnected therewith, to divide the air into thin layers, a metallic flue or hollow support to which the said plates are directly connected, to be heated thereby by conduction, and means to heat the support, substantially as described.

3. An air-heating apparatus comprising an inclosing casing, through which the air to be heated passes, a hollow metallic flue or chimney within the casing, a series of conical slightly-separated sheet-metal heating-plates secured to said flue, to be heated thereby by conduction, and a burner adapted to be inserted in the base of and to heat the flue, substantially as described.

4. An air-heating apparatus comprising an inclosing casing open at its lower end, a drum mounted on the casing and having escape-passages therethrough communicating with the upper end of the casing, a central metallic flue within the casing and opening into the drum, a series of sheet-metal cones secured concentrically to said flue, to be heated by conduction thereby, and means to heat the flue, the products of combustion passing into the drum, substantially as described.

5. An air-heating apparatus comprising a metallic chimney, a burner adapted to be inserted in the lower end of and to support the chimney, a series of inverted sheet-metal cones secured to the chimney concentrically, and provided with circulation-openings, a surrounding casing through which the air to be heated passes, said casing being open at its lower end, and having escape-passages at its upper end for the heated air, substantially as described.

6. An air-heating apparatus comprising a casing, a hollow metallic flue and a series of concentrically-attached slightly-separated sheet-metal heating-cones, all within and disconnected from the casing, a burner to heat said flue, a drum located on the casing and through which the heated air passes from the casing, said drum having a sight-opening in its top above the flue, by which the condition of the burner-frame may be observed, substantially as described.

In testimony whereof I have signed my name to this specification in the presence of two subscribing witnesses.

MORTON F. BEAL.

Witnesses:
JOHN C. EDWARDS,
AUGUSTA E. DEAN.